United States Patent
Martin et al.

(10) Patent No.: US 7,423,006 B2
(45) Date of Patent: *Sep. 9, 2008

(54) AQUEOUS CLEANING COMPOSITIONS COMPRISING CATIONIC COPOLYMERS

(75) Inventors: Emmanuel Martin, Folgensbourg (FR); Keith Graham, Huddersfield (GB); David Normington, Leeds (GB); Malcolm Skinner, Bradford (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 10/535,799

(22) PCT Filed: Nov. 19, 2003

(86) PCT No.: PCT/EP03/50848

§ 371 (c)(1),
(2), (4) Date: May 20, 2005

(87) PCT Pub. No.: WO2004/050815

PCT Pub. Date: Jun. 17, 2004

(65) Prior Publication Data

US 2006/0074003 A1   Apr. 6, 2006

(30) Foreign Application Priority Data

Nov. 29, 2002  (EP) .................. 02406042

(51) Int. Cl.
  *C11D 3/37* (2006.01)
(52) U.S. Cl. ..................... 510/475; 510/238
(58) Field of Classification Search ............. 510/238, 510/475
  See application file for complete search history.

(56) References Cited

U.S. PATENT DOCUMENTS

| | | | | | |
|---|---|---|---|---|---|
| 3,975,341 | A | * | 8/1976 | Trapasso | 524/801 |
| 4,506,062 | A | * | 3/1985 | Flesher et al. | 526/211 |
| 4,822,620 | A | * | 4/1989 | Chamberlain et al. | 426/2 |
| 5,100,660 | A | * | 3/1992 | Hawe et al. | 424/78.35 |
| 5,258,473 | A | * | 11/1993 | Niessner et al. | 526/78 |

FOREIGN PATENT DOCUMENTS

| | | |
|---|---|---|
| EP | 202780 | * 11/1986 |
| EP | 395282 | * 10/1990 |

* cited by examiner

*Primary Examiner*—John R Hardee
(74) *Attorney, Agent, or Firm*—Joseph C. Suhadolnik

(57) ABSTRACT

The invention relates to aqueous compositions, preferably aqueous compositions comprising at least one polymer with a particle size of more than 10 μm, formed from the polymerisation of a) at least one monomer of formula (I), wherein $R_1$, signifies hydrogen or methyl, $R_2$ signifies hydrogen or $C_1$-$C_4$alkyl, $R_3$ signifies $C_1$-$C_4$alkylene, $R_4$, $R_5$ and $R_6$ signify independently from each other hydrogen or $C_1$-$C_4$alkyl, X signifies —O— or —NH— and Y signifies Cl; Br; I; hydrogen-sulphate or methosulfate, b) and/or at least one non-ionic monomer, c) at least one cross-linking agent in an amount of 0-50 ppm by the weight of component a) and b) optionally at least one chain transfer agent with the proviso that (i) if the polymer is a cationic homopolymer then the amount of the crosslinking agent is always more than 0 ppm and less than 50 ppm.

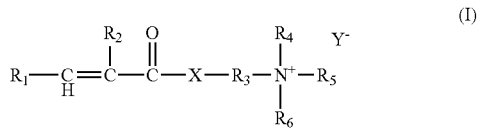

6 Claims, No Drawings

AQUEOUS CLEANING COMPOSITIONS COMPRISING CATIONIC COPOLYMERS

This invention relates to aqueous compositions comprising homo- and/or copolymers as thickeners, as well as to new acidic aqueous cleaning formulations.

It is standard practice to include viscosifying polymers in acidic aqueous household formulations in order to achieve optimum rheology characteristics. Various polymer types have been proposed for the purpose of increasing the viscosity of household formulations.

EP-A-458599 refers to fabric treatment compositions consisting of an aqueous base, fabric softening materials and a deflocculating polymer.

WO-A-99/06455 describes thickening agents for acidic compositions, which include cationic homopolymers with 50 to 600 ppm cross-linking agents. The preferred range of cross-linking agent is between 60 and 250 ppm.

Although the polymers used in aqueous compositions described in the prior art do achieve viscosification of the composition, there is still a need to provide further improvement in rheology profile. This is particularly important where the aqueous composition is expected to perform under a number of different conditions and environments.

The invention relates to aqueous compositions comprising at least one polymer, with a particle size of more than 10 μm, formed from the polymerisation of a) at least one monomer of formula (I)

$$R_1-\underset{H}{C}=\underset{R_2}{C}-\underset{O}{\overset{O}{\parallel}}{C}-X-R_3-\underset{R_6}{\overset{R_4}{\underset{|}{N^+}}}-R_5 \quad Y^- \quad (I)$$

wherein
$R_1$ signifies hydrogen or methyl,
$R_2$ signifies hydrogen or $C_1$-$C_4$alkyl,
$R_3$ signifies $C_1$-$C_4$alkylene,
$R_4$, $R_5$ and $R_6$ signify independently from each other hydrogen or $C_1$-$C_4$alkyl,
X signifies —O— or —NH— and
Y signifies Cl; Br; I; hydrogensulphate or methosulfate, b) and/or at least one non-ionic monomer,
c) at least one cross-linking agent in an amount of 0-50 ppm by the weight of component a) and
d) optionally at least one chain transfer agent with the proviso that
   (i) if the polymer is a cationic homopolymer then the amount of the crosslinking agent is always more than 0 ppm and less than 50 ppm.

The used polymer can be added to the aqueous composition in solid or liquid form. The solid form can be further classified into
(i) powder, or
(ii) beads, which are non-dusting particles.

If the polymer is added to the composition in solid form, the beads form is preferred.

Preferably, the aqueous composition has a pH-value <7. More preferably, the pH-value is <5.

Preferably, the aqueous compositions are acidic household formulations. More preferably the aqueous formulations are acidic general-purpose cleaners for hard surfaces.

The polymer is added to the composition while in the form of particles, which have a volume average size of more than 10 μm and up to 1000 μm, preferably more than 50 μm, especially preferred from 100 μm and up to 1000 μm. The size of the particles can be determined by known methods, i.e. with laser diffraction.

In a preferred embodiment of the Invention, the polymer is a cationic homopolymer, wherein the amount of the crosslinking agent is always more than 0 ppm and less than 50 ppm.

In a further preferred embodiment of the invention, the polymer is a non-ionic homopolymer.

In a further preferred embodiment of the invention, the component a) comprises 10-100% by weight (wt-%) of at least one cationic monomer and 0-90 wt-% of at least one non-ionic monomer.

In a more preferred embodiment of the invention, the component a) comprises 30-100 wt-% of at least one cationic monomer and 0-70 wt-% of at least one non-ionic monomer.
In an even more preferred embodiment of the invention, the component a) comprises 40-100 wt-% of at least one cationic monomer and 0-60 wt-% of at least one nonionic monomer.

In an especially preferred embodiment of the invention, the component a) comprises 50-95 wt-% of at least one cationic monomer and 5-50 wt-% of at least one non-ionic monomer. The weight percentages relate to the total weight of the polymer Preferred cationic monomers are compounds of formula (I)

$$R_1-\underset{H}{C}=\underset{R_2}{C}-\underset{O}{\overset{O}{\parallel}}{C}-X-R_3-\underset{R_6}{\overset{R_4}{\underset{|}{N^+}}}-R_5 \quad Y^- \quad (I)$$

wherein
$R_1$ signifies hydrogen or methyl,
$R_2$ signifies hydrogen or $C_1$-$C_4$alkyl,
$R_3$ signifies $C_1$-$C_4$alkylene,
$R_4$, $R_5$ and $R_6$ signify independently from each other hydrogen or $C_1$-$C_4$alkyl,
X signifies —O— or —NH— and
Y signifies Cl; Br; I; hydrogensulphate or methosulfate.

The alkyl groups may be linear or branched. The alkyl groups are methyl, ethyl, propyl, butyl and isopropyl.

Preferred non-ionic monomers are N-vinyl pyrrolidone or compounds of formula (II)

$$R_7-\underset{H}{C}=\underset{R_8}{C}-\underset{O}{\overset{O}{\parallel}}{C}-\underset{R_{10}}{\overset{R_9}{N}} \quad (II)$$

wherein
$R_7$ signifies hydrogen or methyl,
$R_8$ signifies hydrogen or $C_1$-$C_4$alkyl, and
$R_9$ and $R_{10}$ signify independently from each other hydrogen or $C_1$-$C_4$alkyl.

Preferably, the cross-inking agent b) contains at least two ethylenically unsaturated moieties. Suitable preferred crosslining agents are divinyl benzene; tetra allyl ammonium chloride; ally acrylates and methacrylates; diacrylates and dimethacrylates of glycols and polyglycols; butadiene; 1,7-octadiene; allyl-acrylamides and ally-methacrylamides;

bisacrylamidoacetic acid; N,N'-methylene-bisacrylamide and polyol polyallylethers, such as polyallylsaccharose and pentaerythrol triallylether.

More preferred cross-linking agents are tetra ally ammonium chloride; allyl-acrylamides and allyl-methacrylamides; bisacrylamidoacetic acid and N,N'-methylene-bisacrylamide.

The most preferred cross-linking agents are tetra ally ammonium chloride and N,N'-methylene-bisacrylamide.

It is also suitable to use mixtures of cross-linking agents.

The cationic homopolymer is always crosslinked by at least one cross-linking agent b). Preferably, the crosslinker(s) is (are) present in the range of from 0.5-49 ppm (based on the component a).

Preferably, the chain transfer agent c) is selected from mercaptanes, malic acid, lactic acid, formic acid, isopropanol and hypophosphites.

In a preferred embodiment of the invention the chain transfer agent c) is present in a range of from 0 to 1000 ppm, more preferably 0-500 ppm, most preferably 0-300 ppm (based on the component a).

It is also suitable to use mixtures of chain transfer agents.

In a preferred embodiment of the present invention the aqueous composition comprises 0.005 to 15 wt-% of the polymer with a particle size of more than 10 µm, more preferably 0.01 to 10 wt-%, most preferably 0.01 to 5 wt-%. The weight percentages relate to the total amount of the aqueous formulation.

In a preferred embodiment of the present invention, the aqueous composition, preferably the acidic aqueous composition, comprises at least one copolymer and/or homopolymer with a particle size of more than 10 µm, preferably more than 50 µm, more preferably from 100 µm and up to 1000 µm, formed from the polymerisation of a) at least one monomer of formula (Ia)

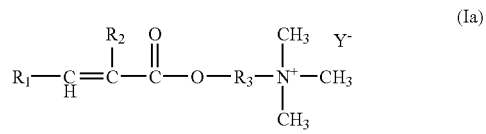

wherein
$R_1$ signifies hydrogen or methyl,
$R_2$ signifies hydrogen or methyl,
$R_3$ signifies $C_1$-$C_2$alkylene and
Y signifies Cl; Br or I, and
b) at least one cross-linking agent selected from divinyl benzene; tetra allyl ammonium chloride; ally acrylates and methacrylates; diacrylates and dimethacrylates of glycols and polyglycols; butadiene; 1,7-octadiene; allyl-acrylamides and ally-methacrylamides; bisacrylamidoacetic acid; N,N'-methylene-bisacrylamide and polyol polyallylethers in an amount of 0-50 ppm (based on the component a), and
c) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a),
with the proviso that
(i) if the polymer is a homopolymer then the amount of the crosslinking agent(s) is always more than 0 ppm and less than 50 ppm.

In a further preferred embodiment of the present invention, the aqueous composition, preferably the acidic aqueous composition, comprises at least one copolymer and/or homopolymer with a particle size of more than 10 µm, preferably more than 50 µm, more preferably from 100 µm and up to 1000 µm, formed from the polymerisation of a) at least one monomer of formula (IIa)

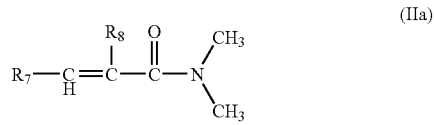

wherein
$R_7$ signifies hydrogen or methyl, and
$R_8$ signifies hydrogen; methyl or ethyl,
b) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), and
c) optionally at least one chain transfer agent selected from mercaptanes; malic acid; lactic acid; formic acid; Isopropanol and hypophosphites in an amount of 0-1000 ppm, preferably 0-500 ppm, more preferably 0-300 ppm (based on the component a),.

In a more preferred embodiment of the present invention, the aqueous composition, preferably the acidic aqueous composition, comprises at least one copolymer with a particle size of more than 10 µm, preferably more than 50 µm, more preferably from 100 µm and up to 1000 µm, formed from the polymerisation of a) at least one monomer of formula (Ia)

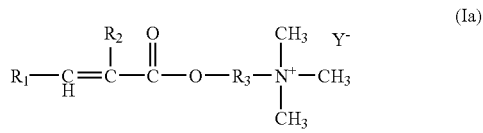

wherein
$R_1$ signifies hydrogen or methyl,
$R_2$ signifies hydrogen or methyl,
$R_3$ signifies $C_1$-$C_2$alkylene and
Y signifies Cl; Br or I, and
b) at least one monomer of formula (IIa)

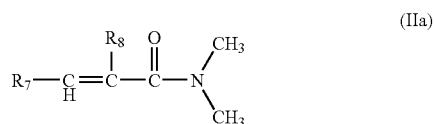

wherein
$R_7$ signifies is hydrogen or methyl, and
$R_8$ signifies hydrogen; methyl or ethyl,
c) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylenebisacrylamide and polyol polyallylethers in an amount of 0-50 ppm (based on the component a), and d) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a).

In an especially preferred embodiment of the present invention, the aqueous composition, preferably the acidic aqueous composition, comprises 0.005-15% by weight, preferably 0.01-10 wt-%, more preferably 0.01-5 wt-% based on the total weight of the composition of at least one copolymer with a particle size of more than 10 μm, preferably more than 50 μm, more preferably from 100 μm and up to 1000 μm, formed from the polymerisation of a) at least one monomer of formula (Ia)

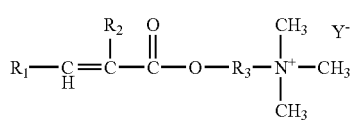
(Ia)

wherein
R$_1$ signifies hydrogen or methyl,
R$_2$ signifies hydrogen or methyl,
R$_3$ signifies C$_1$-C$_2$alkylene and
Y signifies Cl; Br or I, and b) at least one monomer of formula (IIa)

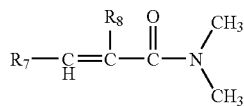
(IIa)

wherein
R$_7$ signifies hydrogen or methyl, and
R$_8$ signifies hydrogen; methyl or ethyl, c) at least one cross-linking agent selected from divinyl benzene; tetra ally ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), and d) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a).

In an important embodiment of the present invention, the aqueous composition, preferably the acidic aqueous composition, comprises 0.005-15% by weight, preferably 0.01-10 wt-%, more preferably 0.01-5 wt-% based on the total weight of the composition, of at least one copolymer with a particle size of more than 10 μm, preferably more than 50 μm, more preferably from 100 μm and up to 1000 μm, formed from the polymerisation of a) 40-95 wt-%, preferably 50-95 wt-%, based on the total weight of the copolymer, of at least one monomer of formula (Ia)

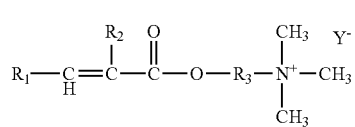
(Ia)

wherein
R$_1$ signifies hydrogen or methyl,
R$_2$ signifies hydrogen or methyl,
R$_3$ signifies C$_1$-C$_2$alkylene and
Y signifies Cl; Br or I, and b) 5-60 wt-%, preferably 5-50 wt-%, based on the total weight of the copolymer, of at least one monomer of formula (IIa)

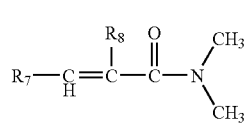
(IIa)

wherein
R$_7$ signifies hydrogen or methyl, and
R$_8$ signifies hydrogen; methyl or ethyl, c) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), and d) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a).

The aqueous compositions are useful as acidic household compositions. Acidic household compositions can be any common known formulations, such as general-purpose cleaners for cleaning hard surfaces, acid household cleaners (bath) or WC cleaners.

The aqueous formulation can be used on many different surface types, such as ceramic, fiber glass, polyurethane and plastic surfaces.

A preferred embodiment of the present invention relates to acidic aqueous compositions, which are transparent.

Household cleaning agents are aqueous or alcoholic (for example ethanol or isopropyl alcohol) solutions of one or more of the following components:
  anionic, nonionic, amphoteric and/or cationic surfactants,
  soaps, prepared by saponification of animal and vegetable greases, like coconut and tallow grease,
  organic acids, like hydrochloric acid, phosphoric acid, citric acid, acetic acid or sulfuric acid,
  for basic products inorganic (NaOH or KOH) or organic bases like triethanolamine,
  abrasives for improved cleaning of surfaces, such as silicas, seed kernel, polyethylene or calciumcarbonate, waxes and/or silicones for maintenance and protection of surfaces, polyphosphates, substances, which eliminate hypochlorite or halogens;

peroxides comprising bleaching activators like TAED, for example sodium perborate, $H_2O_2$ or hypochlorite;

enzymes;

cleaning agents based on wax may comprise solvents selected from benzine, turpentine and/or paraffines and emulsifiers based on wax;

filling agents like silicates, polyphosphates, such as sodium or potassium tripolyphosphate, Zeolithes for powdery cleaning agents;

pigments, lakes or soluble dyes;

perfumes; and light stabilizers, antioxidants, antimicrobials, UV-absorbers and chelating agents.

The actual active ingredient and the actual minimum effective amount will be determined by the actual product/application in which the thickened composition is to be used.

A further embodiment of the present invention is a hard surface cleaning composition comprising:

(i) 0.005-15 wt-%, preferably 0.01-10 wt-%, more preferably 0.01-5 wt-% of at least one polymer as defined above, based on the total weight of the composition, (ii) 1-80 wt-% based on the total weight of the composition, of at least one detergent and/or at least one soap and/or at least one salt of a saturated $C_8$-$C_{22}$ fatty acid and/or at least one unsaturated $C_8$-$C_{22}$ fatty acid, (iii) 0-50 wt-% based on the total weight of the composition, of at least one alcohol, (iv) 0-50 wt-% based on the total weight of the composition, of typical ingredients for cleaning composition, (v) 0-50 wt-% based on the total weight of the composition, of at least one acid, and (vi) tap water or deionised water ad 100 wt-%.

The pH-value of the aqueous acidic compositions is <7, preferably <5.

A more preferred hard surface cleaner composition comprises (i) 0.005-15 wt-%, preferably 0.01-10 wt-%, more preferably 0.01-5 wt-% based on the total weight of the composition, of at least one homopolymer and/or copolymer with a particle size of more than 10 μm, preferably more than 50 μm, more preferably from 100 μm and up to 1000 μm, formed from the polymerisation of a) at least one monomer of formula (Ia)

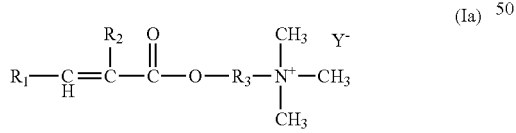

(Ia)

wherein $R_1$ signifies hydrogen or methyl, $R_2$ signifies hydrogen or methyl, $R_3$ signifies $C_1$-$C_2$alkylene and Y signifies Cl; Br or I, b) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), with the proviso that (i) if the polymer is a homopolymer then the amount of the crosslinking agent(s) is always more than 0 ppm and less than 50 ppm, and c) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a), (ii) 1-80 wt-% based on the total weight of the composition, of at least one detergent and/or at least one soap and/or at least one salt of a saturated $C_8$-$C_{22}$ fatty acid and/or at least one unsaturated $C_8$-$C_{22}$ fatty acid, (iii) 0-50 wt-% based on the total weight of the composition, of at least one alcohol, (iv) 0-50 wt-% based on the total weight of the composition, of typical ingredients for cleaning composition, (v) 0-50 wt-% based on the total weight of the composition, of at least one acid, and (vi) tap water or deionised water ad 100 wt-%.

A further preferred hard surface cleaner composition comprises (i) 0.005-15 wt-%, preferably 0.01-10 wt-%, more preferably 0.01-5 wt-% based on the total weight of the composition, of at least one homopolymer and/or copolymer with a particle size of more than 10 μm, preferably more than 50 μm, more preferably from 100 μm and up to 1000 μm, formed from the polymerisation of a) of at least one monomer of formula (IIa)

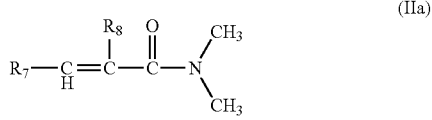

(IIa)

wherein $R_7$ signifies hydrogen or methyl, and $R_8$ signifies hydrogen; methyl or ethyl, b) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), and c) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a), (ii) 1-80 wt-% based on the total weight of the composition, of at least one detergent and/or at least one soap and/or at least one salt of a saturated $C_8$-$C_{22}$ fatty acid and/or at least one unsaturated $C_8$-$C_{22}$ fatty acid, (iii) 0-50 wt-% based on the total weight of the composition, of at least one alcohol, (iv) 0-50 wt-% based on the total weight of the composition, of typical ingredients for cleaning composition, (v) 0-50 wt-% based on the total weight of the composition, of at least one acid, and (vi) tap water or deionised water ad 100 wt-%.

A more preferred hard surface cleaner composition comprises (i) 0.005-15 wt-%, preferably 0.01-10 wt-%, more preferably 0.01-5 wt-% based on the total weight of the composition, of at least one copolymer with a particle size of more than 10 μm, preferably more than 50 μm, more preferably from 100 μm and up to 1000 μm, formed from the polymerisation of a) 50-95 wt-%, based on the total weight of the copolymer, at least one monomer of formula (Ia)

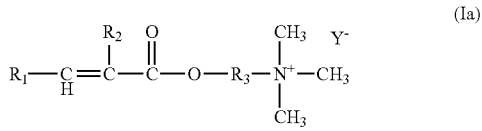

wherein
$R_1$ signifies hydrogen or methyl,
$R_2$ signifies hydrogen or methyl,
$R_3$ signifies $C_1$-$C_2$alkylene and
Y signifies Cl; Br or I, and b) 5-50 wt-%, based on the total weight of the copolymer, at least one monomer of formula (IIa)

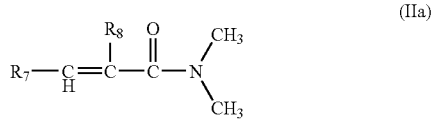

wherein
$R_7$ signifies hydrogen or methyl, and
$R_8$ signifies hydrogen; methyl or ethyl, c) at least one cross-linking agent selected from divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers in an amount of 0-50 ppm (based on the component a), and d) optionally at least one chain transfer agent selected from mercaptanes; malic acid; lactic acid; formic acid; isopropanol and hypophosphites in an amount of 0-1000 ppm, preferably 0-500 ppm, more preferably 0-300 ppm (based on the component a), (ii) 1-80 wt-% based on the total weight of the composition, of at least one detergent and/or at least one soap and/or at least one salt of a saturated $C_8$-$C_{22}$ fatty acid and/or at least one unsaturated $C_8$-$C_{22}$ fatty acid, (iii) 0-50 wt-% based on the total weight of the composition, of at least one alcohol, (iv) 0-50 wt-% based on the total weight of the composition, of typical ingredients for cleaning composition, (v) 0-50 wt-% based on the total weight of the composition, of at least one acid, and (vi) tap water or deionised water ad 100 wt-%.

As component (ii), anionic, nonionic, or zwitterionic and amphoteric synthetic detergents are suitable.

Suitable anionic detergents are
sulfates, for example fatty alcohol sulfates, the alkyl chain of which has from 8 to 18 carbon atoms, for example sulfated lauryl alcohol;

fatty alcohol ether sulfates, for example the acid esters or salts thereof of a polyaddition product of from 2 to 30 mol of ethylene oxide and 1 mol of a $C_8$-$C_{22}$ fatty alcohol;

the alkali metal, ammonium or amine salts, referred to as soaps, of $C_8$-$C_{22}$ fatty acids, for example coconut fatty acid;

alkylamide sulfates;
alkylamine sulfates, for example monoethanolamine lauryl sulfate;
alkylamide ether sulfates;
alkylaryl polyether sulfates;
monoglyceride sulfates;
alkanesulfonates, the alkyl chain of which contains from 8 to 20 carbon atoms, for example dodecyl sulfonate;
alkylamide sulfonates;
alkylaryl sulfonates;
α-olefin sulfonates;
sulfosuccinic acid derivatives, for example alkyl sulfosuccinates, alkyl ether sulfosuccinates or alkylsulfosuccinamide derivatives;
N-[alkylamidoalkyl]amino acids of formula

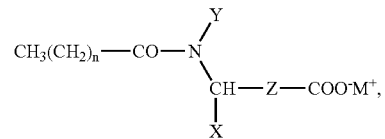

wherein
X is hydrogen, $C_1$-$C_4$alkyl or —COO-M+,
Y is hydrogen or $C_1$-$C_4$alkyl,
Z is

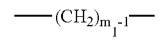

$m_1$ is from 1 to 5,
n is an Integer from 6 to 18 and
M is an alkali metal cation or amine cation,
alkyl and alkylaryl ether carboxylates of formula $CH_3$—X—Y-A wherein
x is a radical of formula —$(CH_2)_{5-19}$—O—,

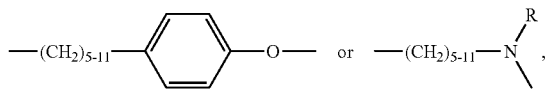

R is hydrogen or $C_1$-$C_4$alkyl,
Y is —$(CHCHO)_{1-50}$—,
A is $(CH_2)_{m2-1}$—COO-M+,
$m_2$ is from 1 to 6 and
M is an alkali metal cation or amine cation.

Also used as anionic surfactants are fatty acid methyl taurides, alkyl isothionates, fatty acid polypeptide condensation products and fatty alcohol phosphoric acid esters. The alkyl radicals occurring in those compounds preferably have from 8 to 24 carbon atoms.

The anionic surfactants are generally in the form of their water-soluble salts, such as the alkali metal, ammonium or amine salts. Examples of such salts include lithium, sodium, potassium, ammonium, triethylamine, ethanolamine, diethanolamine and triethanolamine salts. The sodium, potassium or ammonium ($NR_4R_5R_6$) salts, especially, are used, with $R_4$, $R_5$ and $R_6$ each independently of the others being hydrogen, $C_1$-$C_4$alkyl or $C_1$-$C_4$hydroxyalkyl.

Especially preferred anionic surfactants in the composition according to the invention are monoethanolamine lauryl sulfate or the alkali metal salts of fatty alcohol sulfates, especially sodium lauryl sulfate and the reaction product of from 2 to 4 mol of ethylene oxide and sodium lauryl ether sulfate.

Zwitterionic detergents contain both basic and acidic groups which form an inner salt giving the molecule both cationic and anionic hydrophilic groups over a broad range of pH values. Some common examples of these detergents are described in U.S. Pat. Nos. 2,082,275, 2,702,279 and 2,255,082, incorporated herein by reference. Suitable zwitterionic detergent compounds have the formula

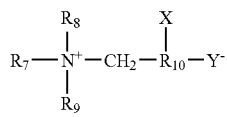

wherein $R_7$ is an alkyl radical containing from about 8 to about 22 carbon atoms, $R_8$ and $R_9$ are independently from each other alkyl radical containing from 1 to about 3 carbon atoms, $R_{10}$ is an alkylene chain containing from 1 to about 3 carbon atoms, X is selected from the group consisting of hydrogen and a hydroxyl radical, Y is selected from the group consisting of carboxyl and sulfonyl radicals and wherein the sum of the $R_7$, $R_8$ and $R_9$ radicals is from about 14 to about 24 carbon atoms. Amphoteric and ampholytic detergents which can be either cationic or anionic depending upon the pH of the system are represented by detergents such as dodecyl-beta-alanine, N-alkyltaurines such as the one prepared by reacting dodecylamine with sodium isothionate according to the teaching of U.S. Pat. No. 2,658,072, N-higher alkylaspartic acids such as those produced according to the teaching of U.S. Pat. No. 2,438,091, and the products sold under the trade name "Miranol," and described in U.S. Pat. No. 2,528,378, said patents being Incorporated herein by reference.

Further suitable zwitterionic and amphoteric surfactants include $C_8$-$C_{18}$betaines, $C_8$-$C_{18}$sulfobetaines, $C_8$-$C_{24}$alkylamido-$C_1$-$C_4$alkylenebetaines, imidazoline carboxylates, alkylamphocarboxycarboxylic acids, alkylamphocarboxylic acids (e.g. lauroamphoglycinate) and N-alkyl-β-aminopropionates or -iminodipropionates, with preference being given to $C_{10}$-$C_{20}$alkylamido-$C_1$-$C_4$akylenebetaines and especially to coconut fatty acid amide propylbetaine.

Nonionic surfactants that may be mentioned include, for example, derivatives of the adducts of propylene oxide/ethylene oxide having a molecular weight of from 1000 to 15 000, fatty alcohol ethoxylates (1-50 EO), alkylphenol polyglycol ethers (1-50 EO), polyglucosides, ethoxylated hydrocarbons, fatty acid glycol partial esters, for example diethylene glycol monostearate, fatty acid alkanolamides and dialkanolamides, fatty acid alkanolamide ethoxylates and fatty amine oxides. Nonionic synthetic detergents comprise a class of compounds which may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements As component (ii) there may also be used the salts of saturated and unsaturated $C_8$-$C_{22}$ fatty acids (soap) either alone or in the form of a mixture with one another or in the form of a mixture with other detergents mentioned as component (ii). Examples of such fatty acids include, for example, capric, lauric, myristic, palmitic, stearic, arachidic, behenic, caproleic, dodecenoic, tetradecenoic, octadecenoic, oleic, eicosenoic and erucic acid, and the commercial mixtures of such acids, such as, for example, coconut fatty acid. Such acids are present in the form of salts, there coming into consideration as cations alkali metal cations, such as sodium and potassium cations, metal atoms, such as zinc and aluminium atoms, and nitrogen-containing organic compounds of sufficient alkalinity, such as amines and ethoxylated amines. Such salts may also be prepared in situ.

The fatty acids used in making the soaps can be obtained from natural sources such as, for instance, plant or animal-derived glycerides (e.g., palm oil, coconut oil, babassu oil, soybean oil, castor oil, tallow, whale oil, fish oil, tallow, grease, lard and mixtures thereof). The fatty acids can also be synthetically prepared (e.g., by oxidation of petroleum stocks or by the Fischer-Tropsch process).

Alkali metal soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium and potassium tallow and coconut soaps.

The term "tallow" is used herein in connection with fatty acid mixtures which typically have an approximate carbon chain length distribution of 2.5% $C_{14}$, 29% $C_{16}$, 23% $C_{18}$, 2% palmitoleic, 41.5% oleic and 3% linoleic (the first three fatty acids listed are saturated). Other mixtures with similar distribution, such as the fatty acids derived from various animal tallows and lard, are also included within the term tallow. The tallow can also be hardened (i.e., hydrogenated) to convert part or all of the unsaturated fatty acid moieties to saturated fatty acid moieties. When the term "coconut oil" is used herein ft refers to fatty acid mixtures which typically have an approximate carbon chain length distribution of about 8% $C_8$, 7% $C_{10}$, 48% $C_{12}$, 17% $C_{14}$, 9% $C_{16}$, 2% $C_{18}$, 7% oleic, and 2% linoleic (the first six fatty acids listed being saturated). Other sources having similar carbon chain length distribution such as palm kernel oil and babassu oil are included with the term coconut oil.

As component (iii) there come into consideration as dihydric alcohols especially those compounds having from 2 to 6 carbon atoms in the alkylene moiety, such as ethylene glycol, 1,2- or 1,3-propanediol, 1,3-, 1,4- or 2,3-butanediol, 1,5-pentanediol and 1,6-hexanediol.

Preference is given to 1,2-propanediol (propylene glycol).

Preferred monohydric alcohols are ethanol, n-propanol and isopropanol and mixtures of those alcohols.

As component (iv) the thickened aqueous compositions may further comprise conventional ingredients known to be used therein. Such ingredients may be perfumes; colorants; bactericide; enzymes such as protease; dyes; chelants; further viscosity modifiers, such as xanthan gum; pigments; solvents; corrosion inhibitors; preservatives; antioxidants:

hydrotropes; and builder such as carboxylic acid detergent including citric and tartaric acids.

Exemplary acids uses as component (v) compositions of the present invention include, without limitation, citric, sulfuric, hydrochloric, phosphoric, acetic, hydroxyacetic, and sulfamic acids.

The polymers used in the acidic aqueous compositions are obtainable by conventional polymerisation processes.

A preferred polymerisation process is the commonly known inverse suspension technique in a hydrocarbon solvent in the presence of a polymeric stabilizer. The polymerisation process being initiated by a redox coupler. A dry polymer is recovered by azeotropic distillation of water and solvent A) Synthesis of the Cationic Polymer This example illustrates the preparation of a suitable cationic polymer.

An 'aqueous phase' of water soluble components is prepared by admixing together the following components:

| | |
|---|---|
| 51 g | of acrylamid, |
| 118 g | of methyl chloride quaternised dimethylamino ethyl acrylate |
| 0.13 g | of a sequesterant |
| 0.0044 g | of potassium bromate |
| 0.06125 g | of 2,2-azobis(2-amidinopropane)dihydrochloride and water. |

A continuous 'oil phase' Is prepared by admixing together the following components:

| | |
|---|---|
| 300 g | of Exxsol ® D40 (dearomatised hydrocarbon solvent) |
| 2 g | a polymeric stabilizer |

The continuous phase was deoxygenated by nitrogen gas for 20 minutes. Afterwards, the phase was agitated with a Rushton turbine stirrer at 400 rpm.

The monomer solution was then added to the agitated continuous phase and allowed to disperse for 3 minutes. The temperature of the suspension was adjusted to 25° C. The suspension was initiated by addition of Sulphur dioxide in Solvent D40 (0.656 ml of a 1% vol/vol solution).

When the exothermic reaction was completed, water was azeotroped off the suspension under reduced pressure. The resulting suspension of polymer beads was cooled to 25° C., filtered and air-dried. The obtained particle size of the polymer beads is about 240 μm. The size is measured with a Sympatec HELOS laser diffraction apparatus (from Sympatec GmbH, Germany).

EXAMPLES 2-15

In analogy to the synthesis of Example 1 the following polymers are synthesized.
Monomer 1 (M1)=dimethylaminoethylacrylate
Monomer 2 (M2)=acrylamide
Crosslinker 1 (CL1)=N,N'-methylenebisacrylamide
Chain Transfer Agent 1 (CTA1)=hypophosphite

| Exp. | M1 in % | M2 in % | CL1 in ppm | CTA 1 in ppm |
|---|---|---|---|---|
| 2 | 80 | 20 | 0 | 0 |
| 3 | 80 | 20 | 2.5 | 0 |
| 4 | 80 | 20 | 5 | 0 |
| 5 | 80 | 20 | 8 | 10 |
| 6 | 80 | 20 | 8 | 5 |
| 7 | 60 | 40 | 0 | 0 |
| 8 | 40 | 60 | 0 | 0 |
| 9 | 60 | 40 | 0.5 | 0 |
| 10 | 80 | 20 | 0.5 | 0 |
| 11 | 80 | 20 | 0.5 | 15 |
| 12 | 80 | 20 | 0.5 | 25 |
| 13 | 80 | 20 | 0.5 | 35 |
| 14 | 80 | 20 | 20 | 35 |
| 15 | 80 | 20 | 40 | 35 |

The copolymers of Example 2-15 have a particle size of about 240 μm. The size is measured with a Sympatec HELOS laser diffraction apparatus (from Sympatec GmbH, Germany).

B) Formulation of a Toilet Cleaner Agent

A composition containing

| | |
|---|---|
| 80 wt-% | deion. Water |
| 2.5 wt-% | Dobanol ® 25-7 (alcohol ethoxylate) |
| 2.5 wt-% | Dobanol ® 23-6.5 (alcohol ethoxylate) |
| 15 wt-% | citric acid | is prepared by adding successively both alcohol ethoxylate and the citric acid to water under stirring.

The clear and colourless liquid has pH value of 1.7.

C) Formulation of a Bathroom Cleaner Agent

A composition containing

| | |
|---|---|
| 80 wt-% | deion. Water |
| 2 wt-% | Dehydol ® 04 (Octyl alcohol ethoxytate 4EO) |
| 8 wt-% | Glucopon ® 215CSUP (Fatty alcohol $C_{8-10}$ polyglycoside) |
| 5 wt-% | citric acid |
| 5 wt-% | acetic acid | is prepared by mixing all components together under stirring.

The clear and colourless liquid has pH value of 2.5.

Addition of the Thickener

The cationic polymer (of A) is slowly added to the both formulations at room temperature and under stirring until the formulations are homogenized. All formulations are transparent. The Brookfield viscosity is measured one day after preparation.

| Acidic Formulation | Polymer | Polymer concentration (wt-%) | LV Brookfield Viscosity (22° C./ 30 rpm/mPa · s) |
|---|---|---|---|
| Toilet Cleaner (B) | — | | 5 |
| Toilet Cleaner (B) | Polymer of Example 1 | 1.0 | 1064 |
| Toilet Cleaner (B) | Polymer of Example 2 | 1.0 | 2000 |
| Toilet Cleaner (B) | Polymer of Example 6 | 1.0 | 951 |
| Toilet Cleaner (B) | Polymer of Example 8 | 1.0 | 1164 |
| Bathroom Cleaner (C) | — | | 5 |

-continued

| Acidic Formulation | Polymer | Polymer concentration (wt-%) | LV Brookfield Viscosity (22° C./ 30 rpm/mPa · s) |
|---|---|---|---|
| Bathroom Cleaner (C) | Polymer of Example 1 | 1.0 | 700 |
| Bathroom Cleaner (C) | Polymer of Example 2 | 1.0 | 644 |
| Bathroom Cleaner (C) | Polymer of Example 6 | 1.0 | 480 |
| Bathroom Cleaner (C) | Polymer of Example 7 | 1.0 | 738 |
| Bathroom Cleaner (C) | Polymer of Example 8 | 1.0 | 816 |
| Bathroom Cleaner (C) | Polymer of Example 13 | 1.0 | 1112 |

We claim

1. A hard surface cleaning composition comprising:
(i) 0.005-15 wt-%, based on the total weight of the composition, of at least one non-dusting polymer bead, which polymer bead in a solid form has a particle size of from 100 μm up to 1000 μm, comprising the polymer formed from the polymerisation of
a) at least one monomer of formula (I)

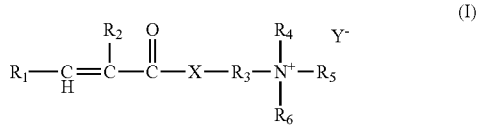

wherein
$R_1$ signifies hydrogen or methyl,
$R_2$ signifies hydrogen or $C_1$-$C_4$alkyl,
$R_3$ signifies $C_1$-$C_4$alkylene,
$R_4$, $R_5$ and $R_6$ signify independently from each other hydrogen or $C_1$-$C_4$alkyl,
X signifies —O— or —NH— and
Y signifies Cl; Br; I; hydrogensulphate or methosulfate,
b) and at least one non-ionic monomer, wherein the non-ionic monomer is a compound of formula (II)

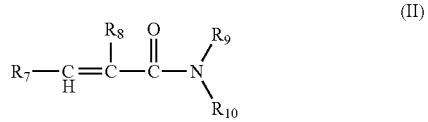

wherein
$R_7$ signifies hydrogen or methyl,
$R_8$ signifies hydrogen or $C_1$-$C_4$alkyl, and
$R_9$ and $R_{10}$ signify independently from each other hydrogen or $C_1$-$C_4$alkyl,
c) at least one cross-linking agent in an amount of 0.5-50 ppm by the weight of component a) and
d) optionally at least one chain transfer agent,
which polymer comprises 50-95 wt-% of at least one cationic monomer of component a) and 5-50 wt-% of at least one non-ionic monomer component b),
(ii) 1-80 wt-% based on the total weight of the composition, of at least one detergent and/or at least one soap and/or at least one salt of a saturated $C_8$-$C_{22}$ fatty acid and/or at least one salt of unsaturated $C_8$-$C_{22}$ fatty acid,
(iii) 0-50 wt-% based on the total weight of the composition, of at least one alcohol,
(iv) 0-50 wt-% based on the total weight of the composition, of typical ingredients for a cleaning composition,
(v) 0-50 wt-% based on the total weight of the composition, of at least one acid, and
(vi) tap water or deionised water ad 100 wt-%,
wherein said composition is aqueous and transparent with a pH of less than 7.

2. A composition according to claim 1, wherein components b) and c) are present and the cross-linking agent of component c) is selected from the group consisting of divinyl benzene; tetra allyl ammonium chloride; allyl acrylates and methacrylates; diacrylates and dimethacrylates of glycols and polyglycols; butadiene; 1,7-octadiene; allyl-acrylamides and allyl-methacrylamides; bisacrylamidoacetic acid; N,N'-methylene-bisacrylamide and polyol polyallylethers.

3. A composition according to claim 2, wherein the cross-linking agent of component c) is selected from the group consisting of tetra allyl ammonium chloride; ally-acrylamides and allyl-methacrylamides; bisacrylamidoacetic acid and N,N'-methylene-bisacrylamide.

4. A composition according to claim 1, wherein the chain transfer agent component d) is selected from the group consisting of mercaptans; malic acid, lactic acid; formic acid; isopropanol and hypophosphites.

5. A composition according to claim 1, wherein the chain transfer agent component d) is present in a range of from 0 to 1000 ppm based on the component a).

6. A method of cleaning a hard surface, which comprises contacting said surface with an effective cleaning amount of a hard surface cleaning composition according to claim 1 to effect cleaning of the surface.

* * * * *